United States Patent
Genouille

Patent Number: 5,560,333
Date of Patent: Oct. 1, 1996

[54] INTERNAL COMBUSTION ENGINE CONNECTING ROD

[75] Inventor: Michel Genouille, Verrieres le Buisson, France

[73] Assignee: Ascometal (Societe Anonyme), Puteaux, France

[21] Appl. No.: 409,232

[22] Filed: Mar. 24, 1995

[30] Foreign Application Priority Data

Apr. 29, 1994 [FR] France ................................. 94 05207

[51] Int. Cl.$^6$ ........................................................ F02B 75/28
[52] U.S. Cl. ........................................ 123/197.3; 74/579 E
[58] Field of Search .......................... 123/197.3, 197.4; 74/579 R, 579 E

[56] References Cited

U.S. PATENT DOCUMENTS

| | | | |
|---|---|---|---|
| 1,851,670 | 3/1932 | Hait | 74/579 R |
| 3,431,796 | 3/1969 | Valbjorn | 74/579 E |
| 3,877,350 | 4/1975 | Earley et al. | |
| 4,491,097 | 1/1985 | Hamann | 123/197.3 |
| 4,709,620 | 12/1987 | Mielke | |
| 4,836,045 | 6/1989 | Lobig | 123/197.3 |
| 4,880,330 | 11/1989 | Mielke | |
| 4,964,374 | 10/1990 | Joshi | 123/197.3 |

FOREIGN PATENT DOCUMENTS

| | | |
|---|---|---|
| 0269135 | 9/1987 | European Pat. Off. |
| 718435 | 6/1931 | France. |
| 3331300 | 3/1985 | Germany. |

*Primary Examiner*—Marguerite McMahon
*Attorney, Agent, or Firm*—Sixbey Friedman Leedom & Ferguson

[57] ABSTRACT

The subject of the present invention is a connecting rod, especially for an internal combustion engine, including a shank (1), a connecting rod small end (2) and a connecting rod big end (3), forming two bearings, each intended to receive an articulation journal, said connecting rod consisting of two elements (5) which are substantially symmetric with respect to a longitudinal midplane (6) of the connecting rod, their joining surface (9) being essentially located in said midplane (6), said elements (5) which each bear a small end bearing (7) and a big end half-bearing (8) being joined together by at least one immobilizing means formed in the shank (1) of the connecting rod, said connecting rod being characterized in that the surface of the two half-bearings in contact with the articulation journal includes at least one flat part (13, 15) situated in a region of said surface furthest from the shank (1) of the connecting rod.

6 Claims, 2 Drawing Sheets

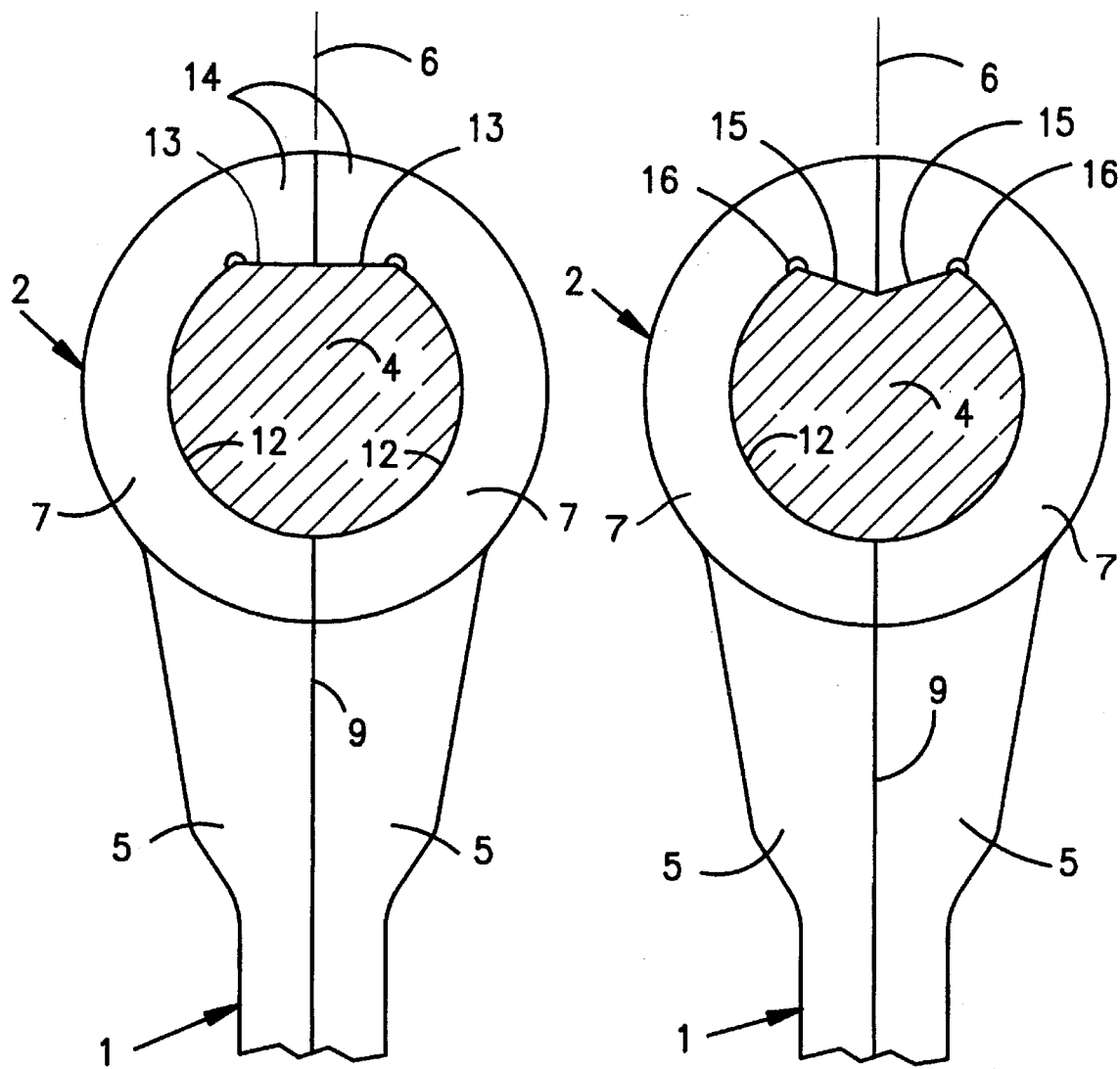

5,560,333

INTERNAL COMBUSTION ENGINE CONNECTING ROD

FIELD OF THE INVENTION

The present invention relates to a connecting rod, especially for an internal combustion engine, including a shank, a connecting rod small end and a connecting rod big end, forming two bearings, each intended to receive an articulation journal, said connecting rod consisting of two elements which are substantially symmetric with respect to a longitudinal midplane of the connecting rod, their joining surface being essentially located in the midplane, said elements which each bear a small end half-bearing and a big end half-bearing being joined together by at least one immobilizing means formed in the shank of the connecting rod.

PRIOR ART

French Patent Application No. 92 13859 makes known a connecting rod including a shank, a connecting rod small end and a connecting rod big end forming cylindrical bearings which are intended to receive an articulation journal. The connecting rod consists of two forged elements which are joined together along a joining surface and locked onto one another by means of immobilizing elements. The two elements each including two half-bearings are substantially symmetric with respect to the longitudinal midplane of the connecting rod and the joining surface is essentially located in the longitudinal midplane. At least one immobilizing element is situated on the shank of the connecting rod between the connecting rod big end and the connecting rod small end.

This patent application describes two elements not joined together, at least at one of their ends, small end and/or big end side, and, by dint of their separation, exhibiting a degree of freedom of rotation with respect to one another about the small end journal and/or the big end journal.

Preferably, the connecting rod small end is in the shape of a crescent or of an open ring, freeing part of the surface of the small end journal giving a reduction in the length of the connecting rod and a reduction in the distance between the small end journal and the base of the piston associated with this articulation journal.

This design of connecting rod small end or big end exhibits the drawback of localizing the forces of contact between the connecting rod and the articulation journals into an angular sector which is relatively remote from the midplane of symmetry of the connecting rod. As a consequence, these contact forces which are normal to the cylindrical bore of the connecting rod small end or big end generate components perpendicular to the midplane of symmetry, the resultant of which gives rise to each connecting rod half-bearing opening up through deformation in bending. This deformation, although very slight, causes microdisplacements between articulation journals and connecting rod half-bearings which leads to the deterioration of the journals through the arrival of a phenomenon known as "fretting" which may detract from the correct operation of the journals, and generate noise.

SUMMARY OF THE INVENTION

The object of the invention is to provide a connecting rod, especially for an internal combustion engine which, in operation, no longer exhibits the effect of each half-bearing separating through deformation in bending.

Its subject is a connecting rod wherein:

the surface of the small end and/or big end half-bearings in contact with the articulation journal includes at least one flat part situated in a region of said half-bearing surface furthest from the shank of the connecting rod.

The other characteristics of the invention are:

at least one flat part is perpendicular to the longitudinal midplane of the said connecting rod.

In one form of the invention, the ends of the small end and/or big end half-bearings of each of the elements extend beyond the plane defined by the joining surface of the connecting rod shank.

In another form of the invention, the two small end and/or big end half-bearings of each of the substantially symmetric elements each form an arc of less than 180° and at least one flat part of one half-bearing forms, together with at least one flat part of the other half-bearing, an angle which cuts into the articulation journal of said bearing.

In general:

at least one flat part of each of the half-bearings subtends a half-arc of less than 45°;

each half-bearing includes at least one groove formed between a flat part and the cylindrical surface of the said half-bearing.

The description which follows and the appended drawings, all given by way of nonlimiting example, will make the invention easy to understand.

BRIEF DESCRIPTION OF THE DRAWINGS

FIG. 2 shows, viewed from the front, part of the connecting rod in one embodiment according to the invention.

FIG. 3 shows, viewed from the front, part of the connecting rod in another embodiment according to the invention.

FIG. 1 shows a connecting rod of the prior art, especially for an internal combustion engine, which includes a shank 1, a connecting rod small end 2 and a connecting rod big end 3 forming bearings which are each intended to receive a cylindrical articulation journal 4 such as a piston pin, represented in fine line in the figure, or a crank shaft wrist pin which has not been represented in said figure. The connecting rod consists of two elements 5 which are symmetric with respect to a longitudinal midplane 6 of the said connecting rod, the elements 5 including a half-bearing 7, 8 at each of their ends.

Figure 1:
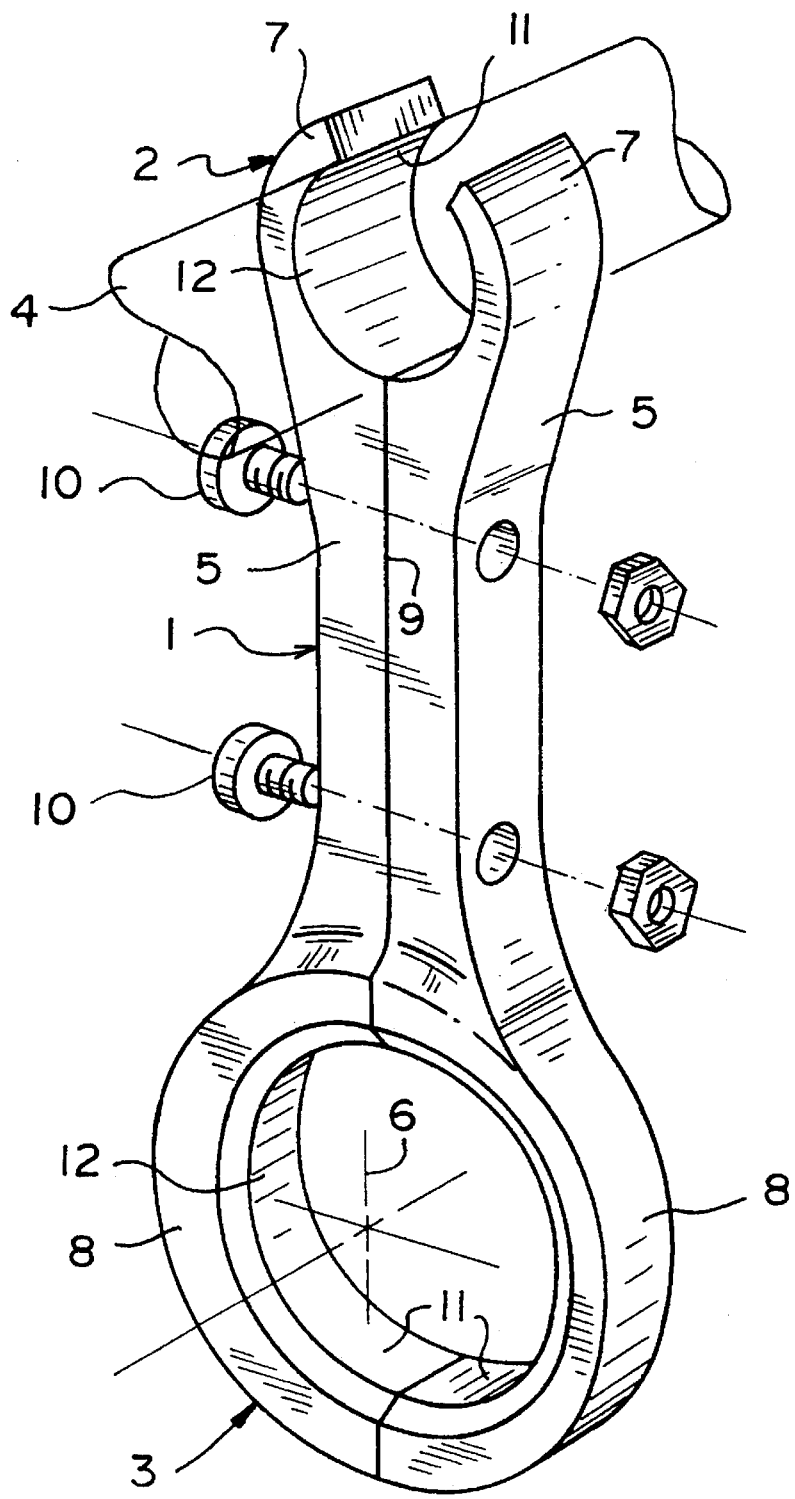
FIG. 1 is an overall perspective view of a connecting rod of the prior art.

The joining surface 9 between the two elements 5 is essentially located in the midplane 6 and the elements 5 are joined together by an immobilizing means formed in the connecting rod shank I between the small end 2 and the big end 3. In this embodiment, the immobilizing means consists of bolts 10.

This connecting rod of the known prior art in operation generates forces of contact between connecting rod half-bearings 7, 8 and articulation journals 4, which forces are localized into an angular sector 11 on either side of the plane of symmetry in a region of the bearings furthest from the shank 1. These contact forces normal to the cylindrical surface 12 of the bore of the bearing generate components perpendicular to the midplane 6, the resultant of which gives rise to a separation of each of the connecting rod half-bearings 7, 8 through deformation in bending.

This deformation, although very slight, causes microdisplacements between articulation journal and bearings, which leads to the arrival of a phenomenon of deterioration of the surfaces called "fretting" which detracts from the correct operation of the journal and generates noise.

FIG. 2, in one embodiment of the invention, shows one end of a connecting rod including a shank 1, a connecting rod small end 2 forming a bearing which is intended to receive an articulation journal 4, such as a piston pin for example.

The connecting rod consists of two elements 5 which are symmetric with respect to the midplane 6 of the connecting rod, the said elements 5 including two half-bearings 7, 8. The big end half-bearings 8 are not represented in the figure.

According to the invention, the surface 12 of each of the half-bearings 7, 8 includes a flat surface part 13 situated in a region of the said surface 12 furthest from the shank 1.

The flat part of each of the half-bearings subtends a half-arc of less than 45°.

When the two half-bearings each form an arc of 180°, the flat surface 13 is perpendicular to the midplane 6.

In this form of the invention, and if the contact region of the flat part is sufficiently great, the forces of contact between the piston pin and the flat parts 13 of the connecting rod half-bearings are parallel to the midplane 6 and to the joining surface 9 and the component of the forces which is perpendicular to this plane is zero.

Producing a flat part on the piston pin in this region of forces secures said pin to the connecting rod small end in terms of rotation.

It is also possible to produce half-bearings which form an arc of 180° with respect to the midplane 6, so that the ends of the said bearings, for example of the small end bearings, each extend beyond the plane defined by the joining surface 9 of the connecting rod shank. Thus, when the two connecting rod elements are joined together by the immobilizing means, the two half-bearings are subjected to prestressing exerted by their end 14 being forced into bearing contact. This prestress avoids or reduces any possible tendency of the two half-bearings to separate, which tendency could arise from the deformation under load applied to the half-bearings via the cylindrical surface of the half-bearings.

In another form of the invention, as represented in FIG. 3, the half-bearings, for example small end half-bearings, of each of the elements 5, which are substantially symmetric, each form an arc of less than 180°, and one flat part 15 of one half-bearing forms, together with the flat part 15 of the other half-bearing, an angle which cuts into the articulation journal 4.

In this form, any possible tendency of the half-bearings to separate is avoided. Indeed, according to the invention, the forces of contact between piston pin and the flat parts 15 of the connecting rod half-bearings 7 generate a component which tends to close up the two half-bearings.

In order to improve the behaviour of the articulation journal 4/half-bearings 7, 8 assembly, the half-bearings include a groove 16 formed between the flat surface and the cylindrical surface of said half-bearings.

This undercut or stress-relief groove 16, in the vicinity of the intersection between the cylindrical surface 12 and the flat surface 13, 15, decreases the local stress intensity factor due to unevenness in its shape.

I claim:

1. An improved connecting rod, especially for an internal combustion engine, including a shank, a connecting rod small end and a connecting rod big end, forming two substantially annular bearings, each intended to receive a cylindrical articulation journal, said connecting rod consisting of two elements which are substantially symmetrical with respect to a longitudinal midplane of the connecting rod, their joining surfaces being essentially located in said midplane, said elements which each bear a small end semi-annular half-bearing and a big end semi-annular half-bearing being joined together by at least one immobilizing means formed in the shank of the connecting rod, the improvement being the surfaces of the small end and/or big end half-bearings in contact with the cylindrical articulation journal include at least one flat part situated in a region of said half-bearing surface furthest from the shank of the connecting rod, and the two small end and/or big end half-bearings of each of the substantially symmetrical elements each form an arc of 180° and at least one flat part of one semi-annular half-bearing forms, together with at least one flat part of the other semi-annular half-bearing, a flat angle which cuts into the cylindrical articulation journal of said bearing.

2. The connecting rod as claimed in claim 1, wherein said at least one flat part is perpendicular to the longitudinal midplane of said connecting rod.

3. The connecting rod as claimed in claim 1, wherein the ends of the small end and/or big end half-bearings of each of the elements extend beyond the plane defined by the joining surface of the connecting rod shank before being assembled together to pre-stress the two ends towards each other.

4. The connecting rod as claimed in claim 1, wherein each half-bearing has a flat part which subtends a half-arc of less than 45°.

5. An improved connecting rod, especially for an internal combustion engine, including a shank, a connecting rod small end and a connecting rod big end, forming two substantially annular bearings, each intended to receive a cylindrical articulation journal, said connecting rod consisting of two elements which are substantially symmetrical with respect to a longitudinal midplane of the connecting rod, their joining surfaces being essentially located in said midplane, said elements which each bear a small end semi-annular half-bearing and a big end semi-annular half-bearing being joined together by at least one immobilizing means formed in the shank of the connecting rod, the improvement comprising means for preventing a separation of said semi-annular half-bearing from one another including the provision of at least one flat part in the surfaces of the small end and/or big end half-bearings in contact with the cylindrical articulation journal in a region of said half-beating surface furthest from the shank of the connecting rod.

6. The connecting rod as claimed in claim 5, wherein each half-bearing has a flat part which subtends a half-arc of less than 45°.

* * * * *